Dec. 14, 1926.
1,610,968

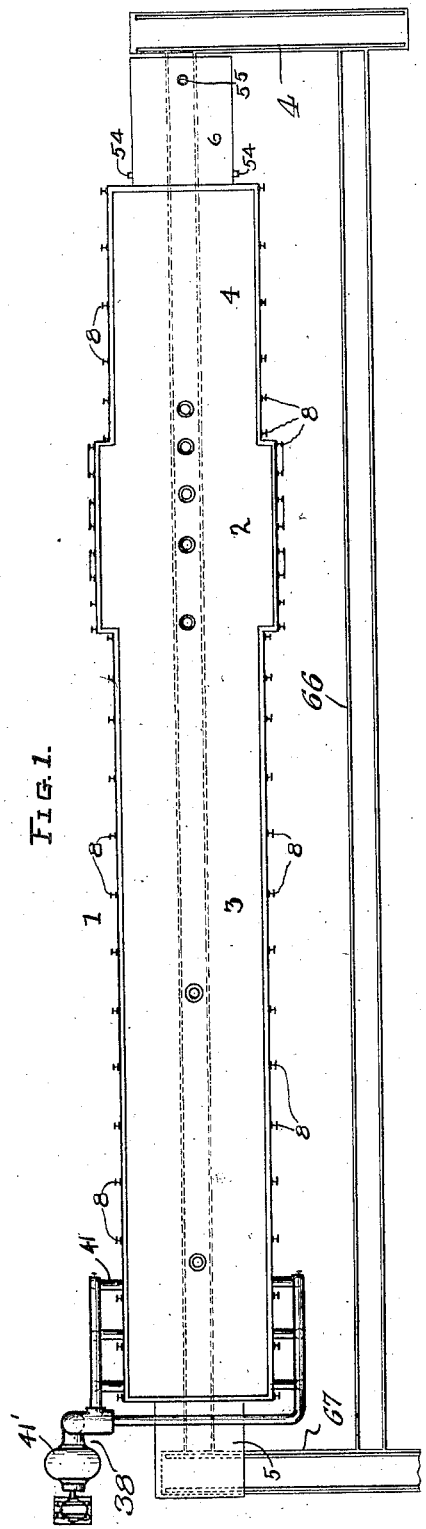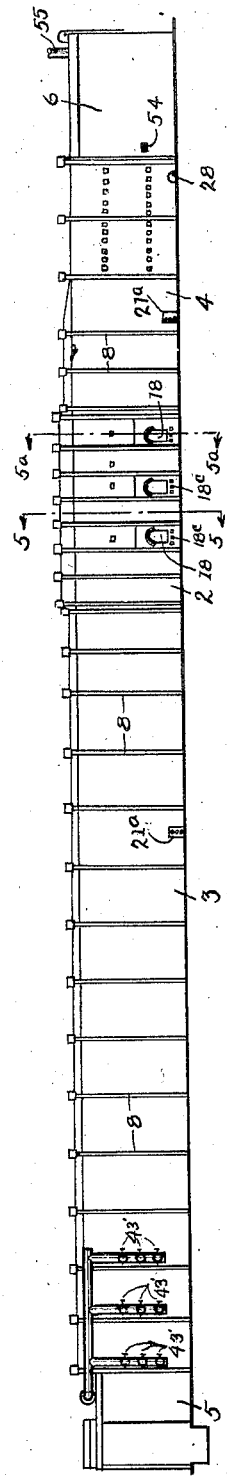

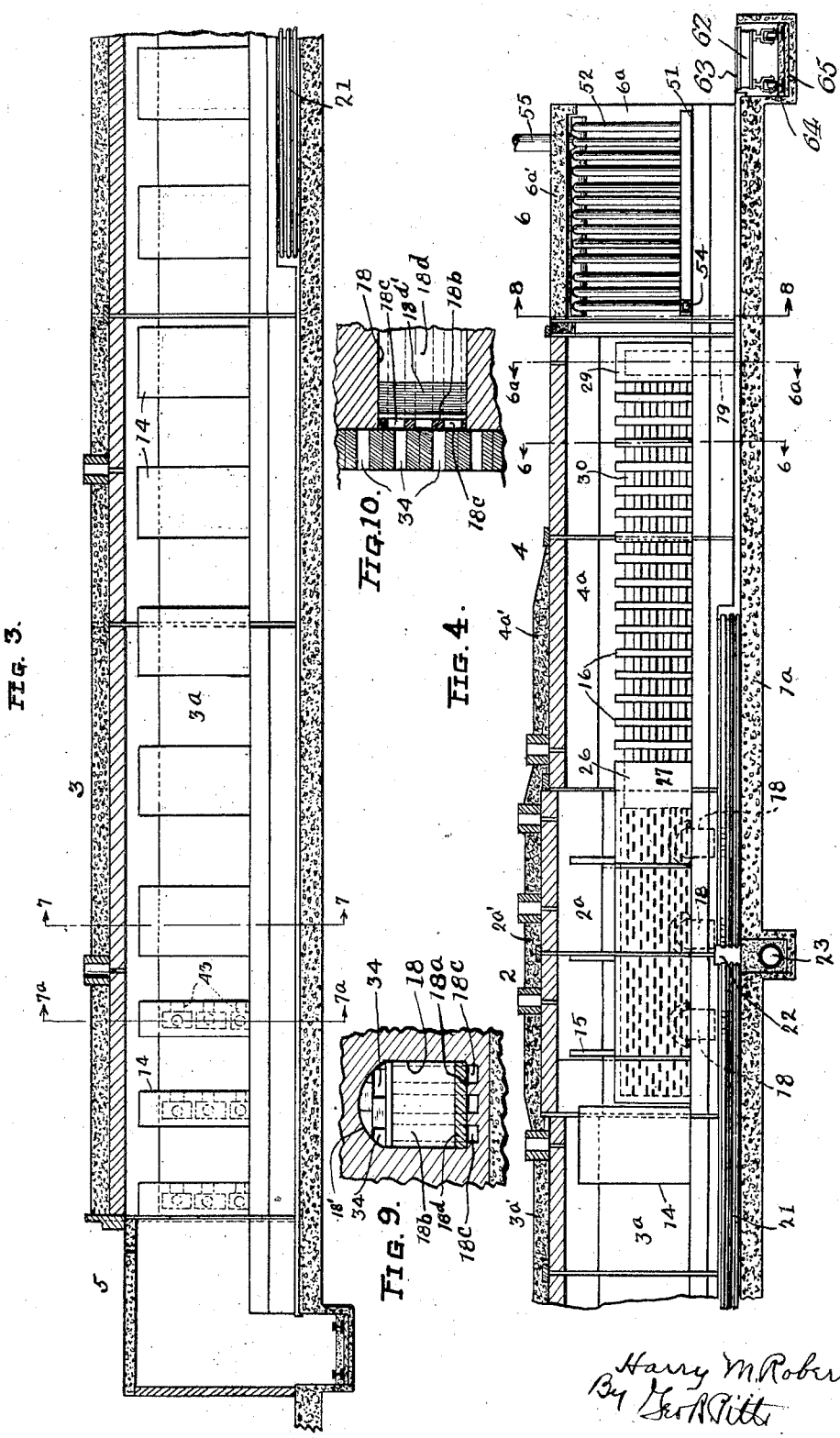

H. M. ROBERTSON

APPARATUS FOR BURNING AND HEAT TREATING MATERIALS AND BODIES

Filed Nov. 27, 1925   4 Sheets-Sheet 3

INVENTOR
Harry M. Robertson
By Geo N Pitts
ATTORNEY

Dec. 14, 1926.

H. M. ROBERTSON 1,610,968

APPARATUS FOR BURNING AND HEAT TREATING MATERIALS AND BODIES

Filed Nov. 27, 1925 4 Sheets-Sheet 4

INVENTOR
Harry M. Robertson
By ____
ATTORNEY

Patented Dec. 14, 1926.

1,610,968

UNITED STATES PATENT OFFICE.

HARRY M. ROBERTSON, OF LAKEWOOD, OHIO.

APPARATUS FOR BURNING AND HEAT-TREATING MATERIALS AND BODIES.

Application filed November 27, 1925. Serial No. 71,783.

This invention relates to an apparatus for burning material and bodies, particularly ceramic ware, including dishes, wall tile, fire brick, building brick, insulators, various products made basically of clay, porcelain products and also for heat treating and annealing iron and steel products or parts. The apparatus is of the continuous kiln type.

One object of the invention is to provide an improved apparatus of this character whereby uniformity of product is insured, greater output results and operating expenses in fuel and labor are decreased.

Another object of the invention is to provide an improved tunnel kiln of simple construction.

Another object of the invention is to construct a continuous kiln operable on the down draft principle and capable of burning or heating the bodies to be treated in a ready manner independently of the manner in which they are positioned, stacked or piled for movement through the kiln.

Other objects of the invention will be apparent to those skilled in the art to which my invention relates from the following description taken in connection with the accompanying drawings, wherein—

Fig. 1 is a plan view of an apparatus embodying my invention.

Fig. 2 is a side elevation of the apparatus.

Figs. 3 and 4 constitute a longitudinal section through the apparatus.

Figure 5:
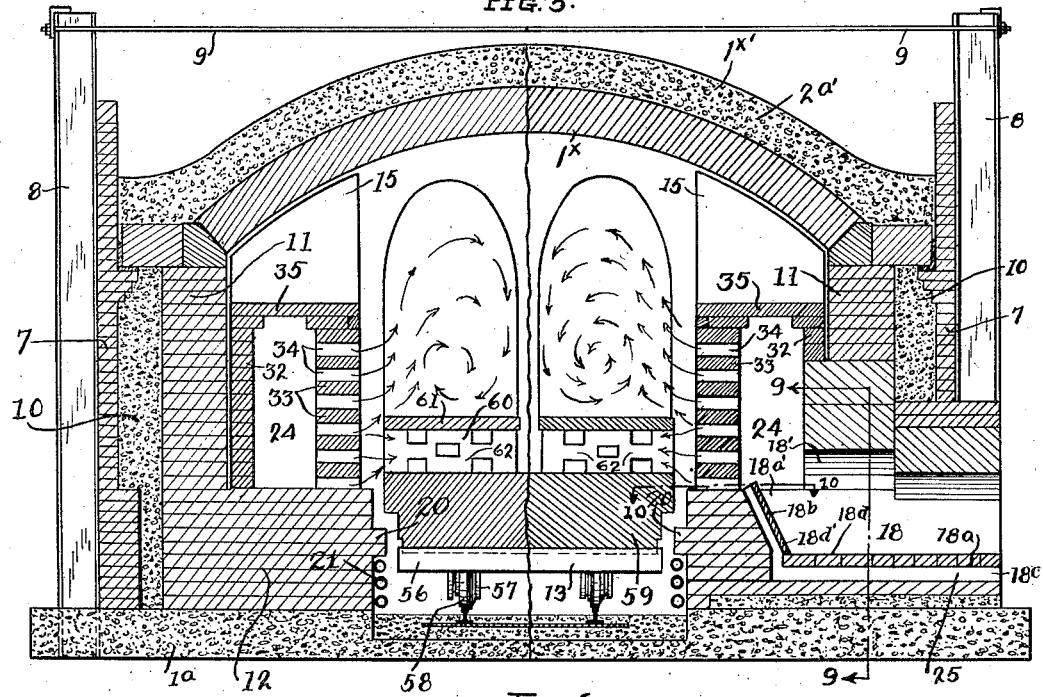

Fig. 5 is a section, partly on the line 5—5 and partly on the line 5ª—5ª of Fig. 2.

Figure 6:
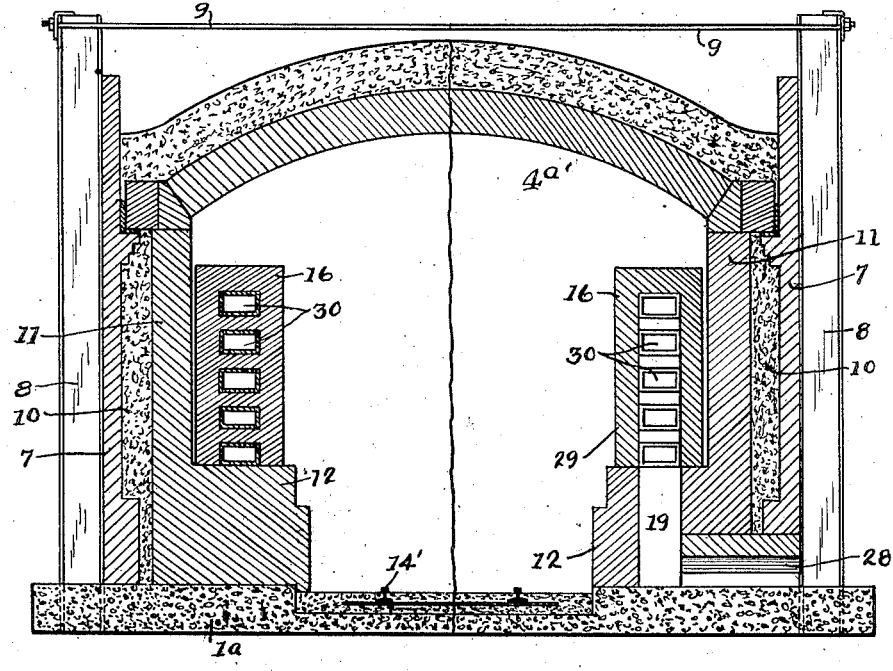

Fig. 6 is a section, partly on the line 6—6 and partly on the line 6ª—6ª of Fig. 4.

Figure 7:
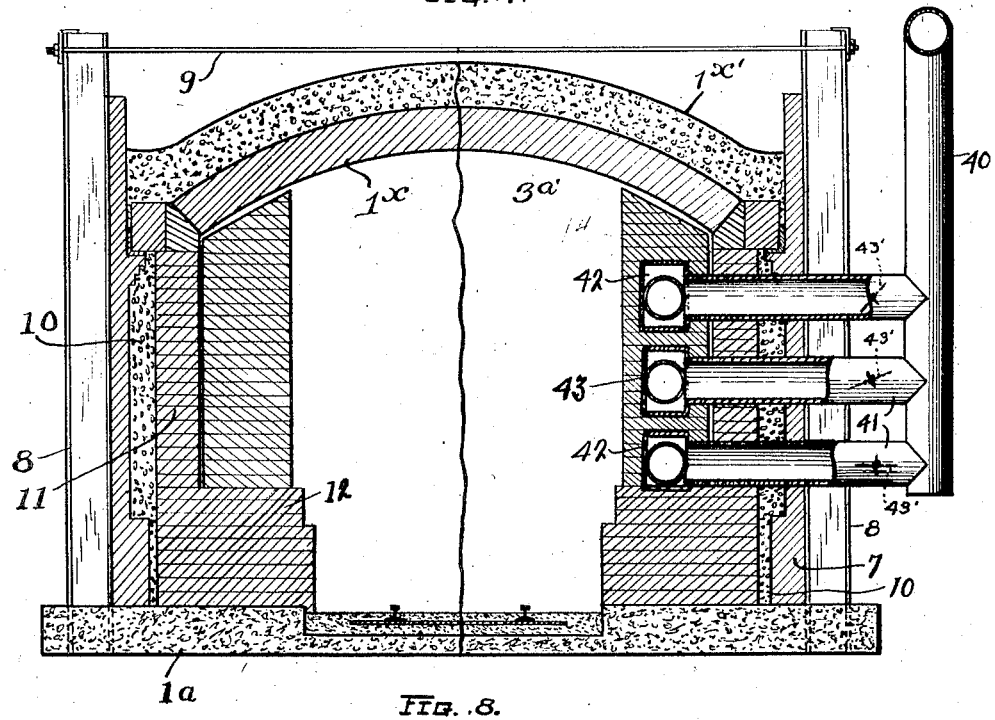

Fig. 7 is a section, partly on the line 7—7 and partly on the line 7ª—7ª of Fig. 3.

Figure 8:
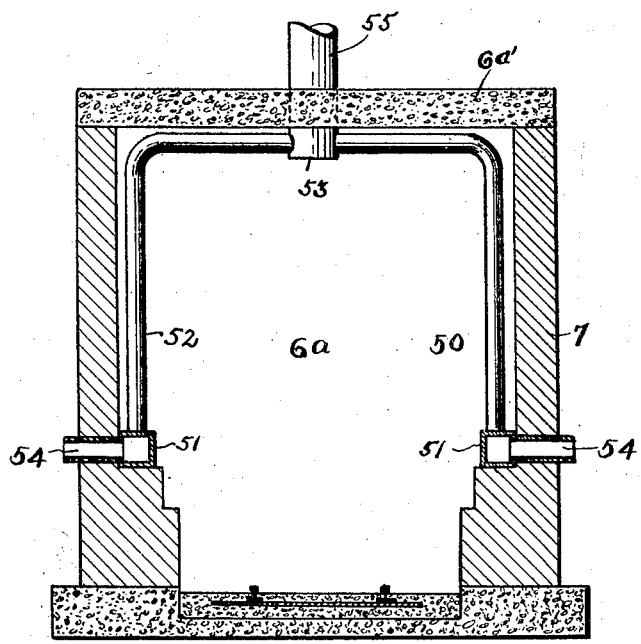

Fig. 8 is a section on the line 8—8 of Fig. 4.

Figs. 9 and 10 are fragmentary sections on the lines 9—9 and 10—10, respectively, of Fig. 5.

In the drawings, 1 indicates as an entirety a kiln having a burning section 2, a preheating section 3 and a cooling section 4; and by preference the preheating section is provided with an inlet section 5 and the cooling section 4 is provided with a supplemental or auxiliary cooling section 6, all of these sections being connected and in line with each other to form a zone 3ª of gradually rising temperature, a zone 2ª having a fixed, predetermined temperature to effect the burning or treatment of the bodies or material, a zone 4ª and a zone 6ª, whereby batches of bodies or loads of material may be passed therethrough and first preheated, then burned or heat treated and then cooled.

The kiln 1 is built on a suitable bed 1ª preferably formed of cement. The outer walls of the kiln 1 may be built of bricks 7 or other materials. These walls may be braced by studs 8, tied together by rods 9, the studs being spaced any desired distances and fixed at their lower ends in the bed 1ª. The walls 7 are lined with insulation, as shown at 10, to properly insulate the inner walls 11, which are preferably formed of fire bricks. The walls of the inlet section 5 and supplemental cooling section 6 may be formed from cement or fire brick. All of the walls that are formed from cement may be reinforced in any manner desired. The inner wall 11 is widened at its lower portion to form benches 12 which extend from end to end of the kiln 1 and form between them a space for the conveying means for the material or bodies, such conveying means in the present instance comprising trucks indicated as an entirety at 13, to which reference will later be made. As will later appear, the trucks 13 fit between the benches 12 and run on tracks 14' and co-operate with the benches to form above the latter the zones 3ª, 2ª, and 4ª, whereby the heat and products of combustion and other gases or vapors may be controlled and readily discharged or exhausted from the kiln and the products of combustion utilized to the best advantage in preheating the batches of loads as they pass through the zone 3ª. The benches 12 have a height approximating the height of the base or main portion of the trucks 13 for reasons which will later appear. The benches 12 also serve as supports for baffles 14, 15, 16, in the zones 3ª, 2ª, and 4ª, respectively, the purpose for which will later be set forth. The benches 12 may be variously constructed from fire brick; for example, they may be made solid or formed with an interior space that is filled with cement; while portions of the benches 12 may be constructed otherwise, for example, to provide for the fuel boxes, indicated as an entirety at 18 or for inlet and outlet conduits 19 (see Fig. 6). To maintain the space below the upper surfaces of the benches 12 relatively cool throughout the heating or burning zone 2ª and the adjacent portions of the preheating zone 3ª and cooling zone 4ª, I provide piping 21 preferably three lines of pipe against or adjacent each bench side face (being mounted on the side face in any desired manner) and circulate through such piping cold air by means of a suitable blower (not shown) connected to the inlet ends of the pipes 21. As will be understood from Figs. 3, 4 and 5, there are two sets of pipes 21 on each bench side face, one set extending from the central portion of the zone 2ª to any desired point in the preheating zone 3ª and the other set extending from the central portion of the zone 2ª to any desired point in the cooling zone 4ª. At their inner ends the sets of pipes 21 adjacent each bench 12 are connected to a manifold 22. The manifolds 22 are connected with a conduit 23 which is supplied with air from a suitable blower (not shown). The outer ends of the pipes 21 are bent outwardly and project through openings 21ª formed in the walls of the kiln 1. Each bench 12, throughout those portions co-extensive with the piping 21, is cut away to provide ledges 20 which protect the pipes. The blower connected with the conduit 23 serves to force air at atmospheric temperature through the pipes 21 so that through the radiation therefrom the space between the benches, throughout those portions of the burning section 2, and the kiln sections 3ª, 4ª, is kept relatively cool to prevent damaging effect upon the bodies of the trucks 13, their supporting wheels and axle bearings and other parts. By this arrangement of the pipes and their connection with the cold air supply, the cold air is introduced centrally of the kiln and at the point of maximum temperature.

The zones 3ª, 2ª and 4ª are covered by roofs 3ª′, 2ª′, 4ª′, respectively, each of the roofs 3ª′, 2ª′, comprising an arch 1ˣ of suitable fire bricks covered with insulation 1ˣ′. If desired, the insulation over the outer end portion of the roof 4ª′ may be omitted, as shown in Fig. 4.

The burning or heat treating of the articles or bodies hereinbefore referred to is effected while passing from one end to the other end of the burning zone 2ª, wherein a predetermined temperature, preferably of 1700 to 2400 degrees Fahrenheit, dependent upon the quality and nature of the articles, is maintained, although a higher or lower temperature may be maintained if desired, I having found that within certain limits, a relatively high temperature for a definite period is desired to effect burning or heat treating to insure a complete treatment and uniformity in the products treated. The heating means comprises a pair of combustion chambers 24 extending from end to end of the furnace section 2 preferably on or above the level of the benches 12 at either side of the burning zone 2ª (see Fig. 5), the fuel boxes 18 (already referred to) and air supply conduits 25, 26, arranged to supply heated air to the combustion chambers 24, as will later appear. As shown in Fig. 2, there are a plurality of fuel boxes 18 built or incorporated in the side walls 7, 11, and benches 12 of the burning section 2; these walls being formed to provide openings into the fuel boxes exterior of the apparatus. Each fuel box 18 is provided by constructing in the adjacent bench 12 and wall 7 an opening of the desired shape to form the box having side walls, a bottom wall 18ª and a rear wall 18ᵇ that is upwardly inclined, these walls forming an opening 18ª′ at their inner portions that leads into the bottom of the adjacent combustion chamber 24. By preference the walls 18ª and 18ᵇ of each fuel box are cut away to form one or more grooves or a space 18ᶜ of any desired width leading inwardly through the walls 7, 11 and bench 12, terminating adjacent the opening 18ª′ and the walls 18ª and 18ᵇ are provided with linings 18ᵈ, 18ᵈ′, respectively, preferably formed from slabs of suitable refractory material, which protect the walls 7, 11, and benches 12. As shown in Fig. 9, the linings 18ᵈ, 18ᵈ′ extend over and along the walls 18ª, 18ᵇ, and co-operate with the walls of the grooves 18ᶜ to form the air supply conduit or conduits 25. As the conduit or conduits 25 are connected at their outer ends with the atmosphere, air flows therethrough to the adjacent combustion chamber 24. By this arrangement, this air is heated by the burning fuel in the boxes 18 to a temperature that insures perfect combustion in the chamber 24. The fuel boxes shown are adapted to receive gas or oil burners, but by the provision of suitable grates they may be utilized to burn other kinds of fuel such as coal and coke. The bricks constituting the benches 12 and walls 11 are constructed to form a dome 18′ at the rear end of each fuel box 18 so as to permit free passage of the burning fuel and products of combustion into the adjacent chamber 24. Each conduit 26 comprises a manifold 27, which opens into the adjacent combustion chamber 24 preferably at that end adjacent the discharge end of the burning section 2. The air is supplied to each manifold 27 in the following manner: 28 indicates a conduit or pipe incorporated in each side wall of the cooling section 4, preferably adjacent its discharge end (Fig. 6). The pipe 28 extends through the walls 7, 11, and is connected with the lower end of the conduit 19, the opposite end of which in turn is connected with a manifold 29, so that air at atmospheric temperature is admitted thereto. 30 indicates a series of pipes, preferably of rectangular shape in cross section, extending longitudinally of the cooling section above each bench 12 and in spaced parallel relation and connected at their opposite ends to the adjacent manifolds 29, 27. The air in the pipes 30 is heated by the heat radiating from the material or bodies passing through the cooling zone 4ᵃ on the trucks 13, the transfer of the heat therefrom to the air in the pipes by absorption serving to gradually cool the material or bodies and to heat the air, so that the latter is conditioned for combustion purposes in the combustion chambers 24 to supplement the heated air supplied by the conduits 25. The pipes 30 are mounted in openings formed in the spaced piers or baffle members 16, which are supported on and preferably extend from the benches 12 to the arch or roof 4ᵃ′. As the piers 16 are disposed transversely of the benches and are arranged in spaced relation, they tend to cause the heat to radiate inwardly and outwardly relative to the pipes 30 and thus insure a circulation across or around the latter. The pipes 30 may be formed from fire clay or other suitable fire resisting material. By making them of rectangular shape, maximum area of exposed pipe walls is provided between the inner and outer edges of the piers 16, or at either side of the space required for the passage of the batches on the trucks.

The combustion chambers 24 extend from end to end of the burning section 2, each being disposed above the adjacent bench so as to be on an approximately level with the material or bodies piled on the trucks 13 while the latter are passing through the zone 2ᵃ. Each chamber 24 has a rear refractory wall 32 to protect the inner wall 11, and a front wall 33 having a plurality of uniformly spaced openings 34 through which the flame and products of combustion project and flow into contact with and through and around the bodies or material on the trucks to effect burning or treatment thereof in the manner to be later set forth. Each chamber 24 is provided with a top 35, consisting of slabs of suitable refractory material supported on the upper ends of the walls 32 and 33, as shown in Fig. 5. The baffles or partitions 15 extend from the tops 35 to the arch or roof 2ᵃ′, and have their front edges in a plane coincident with the front or inner face of the wall 33. The baffles 15 are preferably arranged one opposite the other and uniformly spaced from end to end of the zone 2ᵃ (see Fig. 4) and primarily serve to prevent the products of combustion and the heat generated thereby which rise to the upper portion of the zone 2ᵃ after contacting with the bodies being treated from finding a straight path of exit through the zone 2ᵃ; on the other hand the baffles 15 serve to cause these elements and other gases or vapors to flow inwardly and outwardly in a successive manner as they are drawn through the zone 2ᵃ to a zone 3ᵃ by the induced suction, to which reference will later be made; accordingly it will be seen that the products of combustion and other heated gases and air are caused to circulate inwardly and outwardly and thus contact with the material or bodies as they travel toward the zone 3ᵃ.

The heated air and gases and consumed products of combustion flow into and through the preheating zone 3ᵃ and contact with the bodies being moved forwardly therein, the effect of which is to dry out all moisture therein and gradually heat them up to approximately the temperature of the zone 2ᵃ. To more effectively cause these heated elements to penetrate in and around the bodies as they are moved through the zone 3ᵃ, I provide therein a plurality of pairs of piers or baffle elements 14, (already referred to), disposed in spaced relation preferably equal distances from each other. As understood from Fig. 3, the baffle elements 14 constituting each pair are positioned opposite each other on the benches 12, the effect of which arrangement is to cause the heated elements to flow inwardly around these baffle elements and then outwardly into the spaces between them, and thus prevent these elements or gases from forming into a current and flowing in a path leading directly through the zone 3ᵃ; these baffles therefore insure the circulation of these elements into and through the spaces between the bodies being treated.

38 indicates a draft inducing means connected with the zone 3ᵃ and serving to set up a suction effect therein and thus draw all of the heated air and gases, and consumed products of combustion through the zone 2ᵃ into the zone 3ᵃ and through the latter, whereby they are discharged either into the open, or to some suitable apparatus where it is desired to reclaim, as by-products, any of the materials combined or mixed with such gases or vapors. The draft inducing means is regulated to insure the flow of all the heated air, gases and consumed products of combustion rearwardly, that is, toward the inlet end of the section 3, and to prevent any portion thereof entering the cooling zone 4ᵃ without sucking or drawing any air from the zone 4ᵃ. Of these draft inducing means, 40 indicates a discharge pipe or conduit at one side of the preheating section and leading to a suitable point of discharge. 41 indicates a series of pipes, preferably three in number disposed in vertical relation, connected at their outer ends to the discharge pipe 40. The pipes 41 lead inwardly through the wall 7, insulation 10 and wall 11 and open into chambers 42 formed in the adjacent baffle or pier 14, which is formed with inlet openings or ports 43 leading inwardly from its rear face to the chambers 42, so that the suction device may suck the heated air and gases and consumed products of combustion from the zones 3ª therethrough. I preferably provide a draft inducing means at either side of the preheating section 3 in order to equalize the down draft and suction effect upon the flame and products of combustion as they project through the openings 34 and flow throughout the zones 2ª, 3ª. In the preferred form of construction, as illustrated in the drawings, the first three baffles or piers 14 at either side of the space for the conveying means are constructed with inlet ports 43. Where a plurality of piers are utilized, the discharge pipes 41 leading from their chambers 42 may be connected to separate discharge pipes 40 or to a single discharge pipe; likewise the pipes 40 at either side of the side walls may be connected together in any desired manner, and connected to the casing of a suitable fan 41'. The inlet ports 43, pipes 41 or pipes 40 may be provided with suitable valves 43' to regulate the flow of heated air and gases therethrough dependent upon the conditions within the kiln, and character of the bodies being treated. In the regulation of the valves 43', the valve for the lower port 43 is opened to the widest extent; the next upper valve is closed partially and the valve for the upper port is closed to a greater extent, this arrangement causing the heated air and gases to flow in layers through the zone 3ª and to cause a down-draft effect on the flames and consumed products of combustion in the zone 2ª. In a construction of kiln as described, and by the provision (1) at either side of and above the space for the conveying means of combustion chambers having inner walls formed with uniformly spaced outlet openings for the generated flames and products of combustion and (2) draft inducing means at the remote or inlet end of the preheating chamber or section acting downwardly on these flames or jets, I am enabled to cause the heated air and gases and products of combustion which flow inwardly or transversely of the space occupied by the batches of bodies from the exit openings in the inner walls of the combustion chambers to traverse circular or whirling paths in or around the bodies on the trucks or into and through the spaces between such bodies (see arrows in Fig. 5), so that all of the bodies are treated to the desired extent and in a substantially uniform manner. As will be understood from Figs. 4 and 5, the openings 34 are uniformly spaced over the walls 33, from end to end and from top to bottom thereof, so that the flames and products of combustion from these openings flow into continuous unitary whirling masses as indicated by the arrows in Fig. 5 from end to end of the zone 2ª. This circulation is induced by reason of the fact that a suction or vacuum is created at the inlet end of the preheating zone 3ª. As will be understood from Fig. 5, the products of combustion are directed from the exit openings 34 in an inward or transverse direction. Due to the fact that the current set up by the vacuum is in a downward direction in the zone 2ª and longitudinally of the zones 2ª, 3ª, the action of this current in intersecting the products of combustion flowing transversely of the zone 2ª causes the latter to traverse circular or whirling paths and hence penetrate into and around all of the bodies on the trucks 13 as they move toward the cooling zone 4ª.

The supplemental cooling section 6 may be provided with supplemental means 50 for cooling the treated bodies rapidly, since the latter after passing through the cooling zone 4ª have cooled sufficiently to permit the application of any sort of cooling means without danger of affecting them. The supplemental cooling means 50 comprises a pair of longitudinally arranged manifolds 51 connected by a plurality of pipes 52 to a manifold 53 extending longitudinally and centrally of the zone 6ª below its roof 6ª'. The pipes 52 extend upwardly parallel to the side walls of the section 6 and then inwardly parallel to the roof 6ª' (see Fig. 8) and they may be arranged at any desired distance from each other. Each manifold 51 has an inlet pipe 54 leading laterally through the adjacent side wall and the manifold 53 has a discharge pipe 55 leading upwardly through the roof 6ª', which pipe has connected to it a suction fan (not shown) for inducting a circulation through the manifolds 51, pipes 52 and manifold 53. In the preferred arrangement the inlets 54 are connected to the ends thereof remote from the discharge pipe 55.

The trucks 13 preferably comprise (1) a frame 56 having depending supports 57 in which are provided axles for wheels 58 adapted to engage the tracks 14'; (2) a body portion 59 formed of suitable refractory material, such as fire brick; and (3) a platform section 60 also formed of refractory material but constructed to provide a base 61 with circuitous passages 62 therebelow for the products of combustion and heated air and gases. The base 61 may be formed in sections to form spaces between them and thus facilitate the free circulation of these ingredients.

The bodies to be treated may be stacked or piled on the bases 61 in any usual or preferred manner. Furthermore, the trucks 13 may be moved through the zones in any desired manner, by a continuous or intermittent movement and in abutting or spaced relation.

In the operation of my kiln, the bodies in stacked relation on the trucks are first introduced into and passed through a zone where the temperature is gradually increased from approximately atmospheric temperature to the temperature at which the burning is effected, then the bodies enter and pass through a zone of a predetermined temperature so that for a predetermined period they are subjected to the desired temperature to insure complete burning or treatment, and finally they are passed into and through a cooling zone where their heat is utilized to heat air which is supplied to the combustion chamber. During the passage of the bodies through these zones, they are continuously subjected to a draft induced at or near the entrance end of the kiln, the effect of which is to carry off the consumed products of combustion, heated air, gases and vapors rearwardly and through the zone 2$^a$ and through the zone 3$^a$ to (1) provide in the preheating zone 3$^a$ a temperature that gradually increases to a higher degree from the inlet end thereof to its outlet end so that when the bodies enter the burning zone 2$^a$ they have been heated to a temperature sufficient to insure their complete and full treatment while passing therethrough; and (2) to prevent it passing into the cooling zone 4$^a$. From the foregoing description it will be seen that in my form of construction I provide for a definite period of preheating, a definite period of heat treatment and a cooling chamber directly connected with the burning zone but unaffected thereby, so that through radiation of the heat from the treated bodies supplemented by the heating of air in the air circulation pipes the bodies may be quickly moved outside of the kiln.

I have found that in a continuous tunnel kiln of the construction herein disclosed, very material reduction in fuel and labor may be attained.

The trucks 13, when being discharged from the section 6, are run onto a transfer truck 62 (see Fig. 4) provided with tracks 63, the truck 62 being mounted on tracks 64, disposed in a channel 65. In this latter position, each truck 13 may be unloaded. The truck 62 is then moved along the tracks 64, until the tracks 63 thereon, align with tracks 66. The truck 13 is then moved onto and along the latter tracks to the inlet end of the kiln 1, where it is moved onto a second transfer truck (not shown) preferably similar to the truck 62, and movable on tracks 67, by means of which the truck 13 is moved into position to be run onto the tracks 14' and into and through the kiln 1, it being first loaded for this purpose in any desired manner. As will be understood there are a series of trucks 13 passing continuously or intermittently, as desired, through the kiln 1 and as fast as they move out of the kiln they are unloaded, moved to the inlet end of kiln, re-loaded and then moved into the kiln.

To those skilled in the art to which my invention relates, many changes in construction and widely differing embodiments and applications of my invention will suggest themselves without departing from the spirit and scope thereof. My disclosures and the description herein are purely illustrative and are not intended to be in any sense limiting.

What I claim is:

1. In a continuous kiln, the combination of a burning section, a preheating section and a cooling section aligned to form zones through which batches of bodies are passed, combustion chambers extending longitudinally of said burning section at either side of the path of movement of said batches of bodies, each said combustion chamber being formed by a vertical wall spaced from the adjacent side wall of said section and formed with uniformly spaced exit openings, fuel boxes in communication with each of said chambers, and an air conduit associated with one wall of each of said fire boxes, whereby heated air is supplied to the adjacent chamber the conduits for supplying heated air to said combustion chambers being arranged at uniformly spaced points along each combustion chamber.

2. In apparatus of the class described, the combination of a burning section, a preheating section and a cooling section aligned to form zones through which batches of bodies are passed, combustion chambers extending longitudinally of said burning section at either side of the path of movement of said batches, each said combustion chamber being formed by a vertical wall spaced from the adjacent side wall of said section and formed with spaced exit openings, fuel boxes in communication with each of said chambers, and air supply conduits for said chambers, certain walls of said conduits being formed by the bottoms of said fuel boxes.

3. In apparatus of the class described, the combination of a burning section, a preheating section and a cooling section aligned to form zones through which batches of bodies are passed, combustion chambers extending longitudinally of said burning section at either side of the path of movement of said batches, each said combustion chamber being formed by a vertical wall spaced from the adjacent side wall of said section and formed with spaced exit openings, fuel boxes disposed outwardly and below said combustion chambers and having upwardly inclined rear walls for directing the flame and products of combustion upwardly and into said combustion chambers, and air supply conduits extending along the bottoms and rear walls of said boxes and discharging the heated air with the products of combustion into said chambers.

4. In apparatus of the class described, the combination of a burning section, a preheating section and a cooling section aligned to form zones through which batches of bodies are passed, combustion chambers extending longitudinally of said burning section at either side of the path of movement of said batches, each said chamber being formed by a vertical wall spaced from the adjacent side wall of said section and formed with uniformly spaced exit openings arranged to direct the flames and products of combustion transversely of the space through which the batches of bodies move, a draft inducing means connected to the inlet end of said preheating section, and means for supplying heated air to each said chamber.

5. An apparatus as claimed in claim 4 in which the draft inducing means include outlet or exhaust openings disposed in different horizontal planes leading from said preheating section.

6. An apparatus as claimed in claim 4 in which the draft inducing means includes valved outlet or exhaust openings disposed in different horizontal planes leading from said preheating section.

7. In apparatus of the class described, the combination of a preheating section, a burning section and a cooling section disposed in end to end alignment, benches extending along the opposite side walls of said sections and forming a continuous space between them for the passage of loaded supports, combustion chambers mounted on said benches throughout the length of said burning section, said chambers having vertical walls disposed along the inner edges of said benches and formed with uniformly spaced exits extending from the tops of said benches upwardly to a point above the normal height of the loads passed through said space, and means at the inlet end of said preheating section serving to induce a downdraft in said burning section and to prevent flow of the heat and consumed products of combustion into said cooling section.

8. An apparatus as claimed in claim 7 in which aligned baffles in spaced relation are provided throughout said burning section above said combustion chambers.

9. An apparatus as claimed in claim 7 in which aligned baffles in spaced relation are provided along said preheating section between the inlet end of said burning section and said down-draft inducing means.

10. An apparatus as claimed in claim 7 in which aligned baffles in spaced relation are provided along said preheating section between the inlet end of said burning section and said down-draft inducing means and along said burning section above said combustion chambers.

11. An apparatus as claimed in claim 7 in which is provided a vertical tier of air pipes on one of said benches in said cooling section, said pipes extending along said cooling section and connected at the outlet end thereof with the atmosphere and at the inlet end thereof with the adjacent combustion chamber.

12. In a continuous kiln the combination of a burning section, a preheating section, and a cooling section aligned to form zones through which batches of bodies are passed, combustion chambers extending longitudinally of said burning section at each side of the path of movement of said batches of bodies, each said combustion chamber being formed by a vertical wall spaced from the adjacent side wall of said section and formed with uniformly spaced exit openings, fuel boxes in communication with said chambers, an air conduit associated with one wall of each of said fire boxes whereby heated air is supplied to the adjacent chamber, and means for providing a separate supply of heated air at that end of each combustion chamber adjacent to the outlet end of said burning section.

13. In apparatus of the class described the combination of a preheating section, a burning section, a cooling section, said sections disposed in end to end relation to form a kiln having an inlet end and an exit end, benches extending along the inner sides of said sections, combustion chambers along said benches in said burning section, each said chamber having an inner wall extending upward from the free edge of the adjacent bench and formed with exit openings for the consumed products of combustion and a top, aligned baffles disposed in spaced relation on said benches throughout said preheating section and on said chamber tops, and means for supplying air and products of combustion to said combustion chambers.

14. An apparatus as claimed in claim 13 in which an air supply pipe extends inwardly centrally of said burning section and is connected to pipes which are disposed along the side walls of said benches and extend in opposite directions into said preheating section and said cooling section.

15. An apparatus as claimed in claim 13 in which aligned baffles in spaced relation are mounted on the benches in said cooling section and air pipes disposed in spaced relation extend through said baffles from the exit end to the inlet end of said cooling section, whereby the air therein is heated, and are connected to the combustion chambers to supply heated air thereto.

16. In apparatus of the class described, the combination of a preheating section, a burning section and a cooling section, said sections comprising side and top walls disposed end to end to form a kiln having an inlet end and an outlet end, benches extending along said side walls to form a space for the loads of material to be treated, vertical walls extending upwardly from said benches along said burning section in spaced relation to the side walls of the latter, top and end walls co-operating with said vertical walls to form combustion chambers, and fuel boxes formed in said side walls and benches and communicating at their inner ends with said combustion chambers, said side walls and benches being formed with an air conduit extending below the bottom of each said fuel box substantially parallel thereto and opening at a point adjacent the inner end of the adjacent fuel box.

17. In apparatus of the class described, the combination of a preheating section, a burning section and cooling sections disposed in end-to-end alignment, benches extending along the opposite side walls of said sections and forming a continuous space between them for the passage of loaded supports, combustion chambers mounted on said benches throughout the length of said burning section, said chambers having vertical walls disposed along the inner edges of said benches and formed with spaced exit openings extending from the tops of said benches upwardly to a point above the normal height of the loads passed through said space, means at the inlet end of said preheating section serving to induce a draft in said burning section and to prevent flow of the heat and consumed products of combustion into said cooling sections, and a series of air pipes in each of said cooling sections, the pipes in one section being disposed at an angle to the pipes in the other section and the pipes of the inner cooling section being connected with said combustion chambers.

In testimony whereof, I have hereunto subscribed my name.

HARRY M. ROBERTSON.